June 5, 1934. H. WÄLTI 1,961,679
POWER TRANSMISSION MECHANISM
Filed April 5, 1934  2 Sheets-Sheet 1
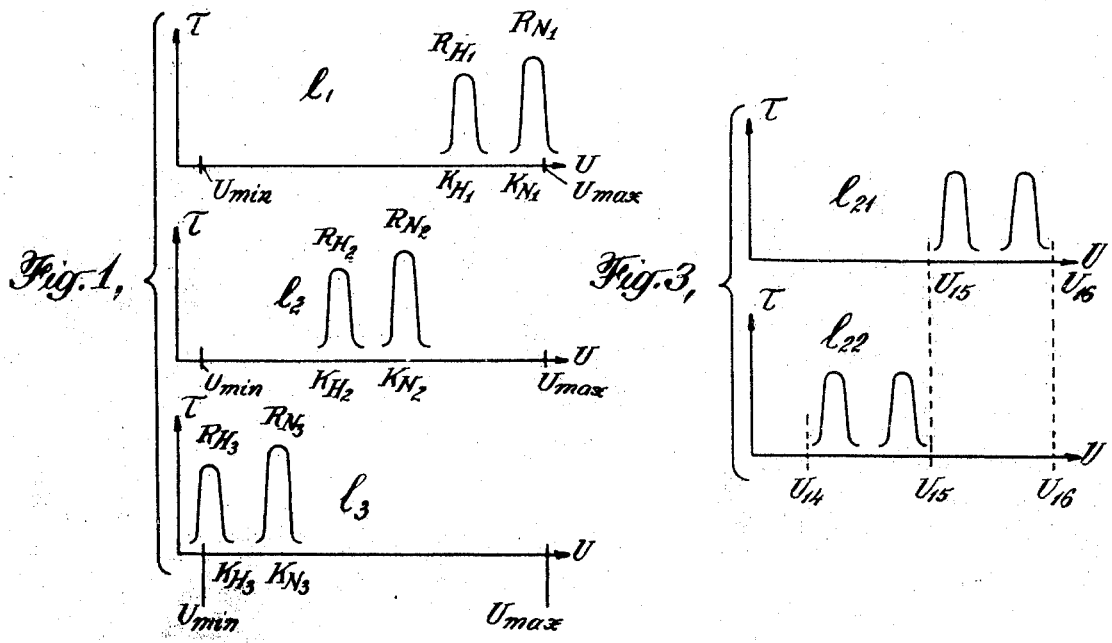
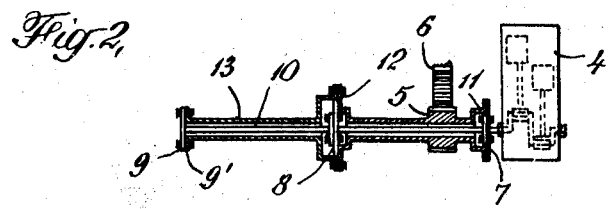
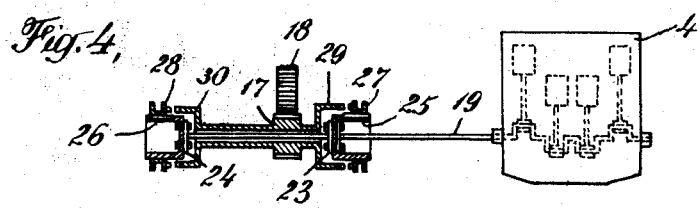
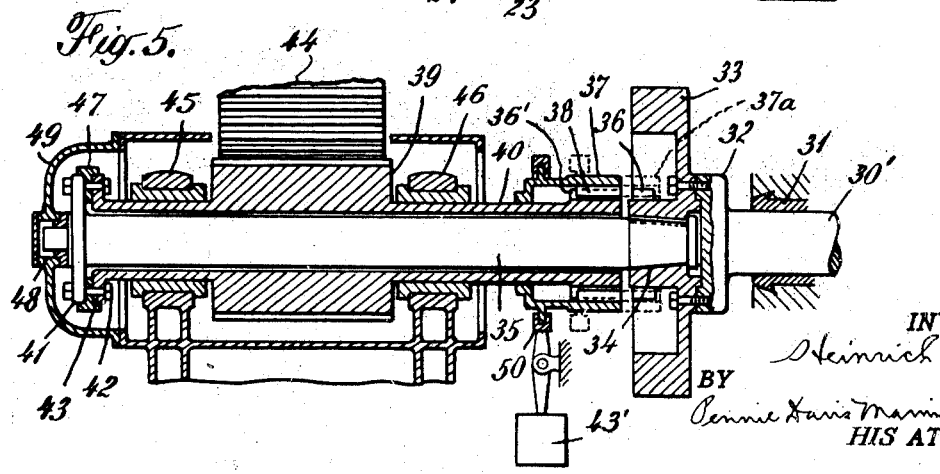
INVENTOR
Heinrich Wälti
BY
HIS ATTORNEYS

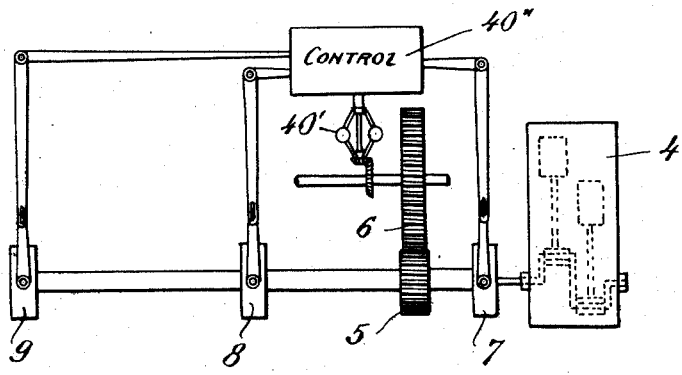
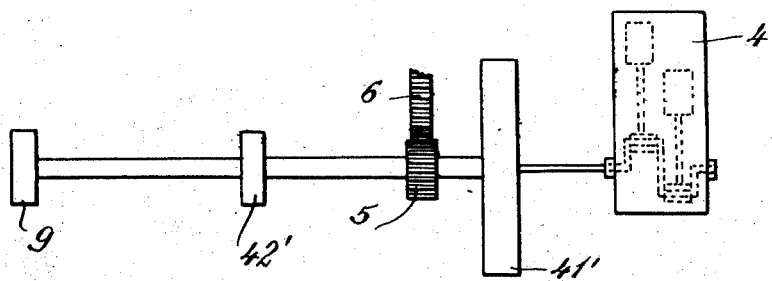
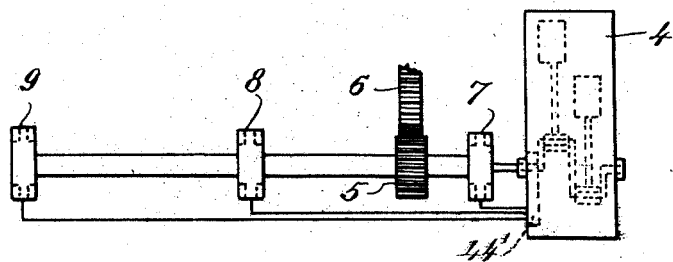
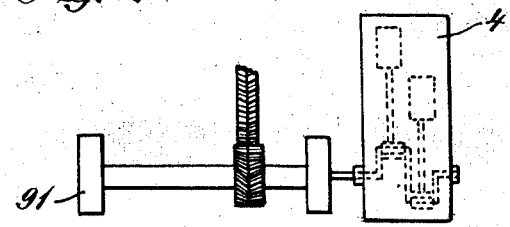

Patented June 5, 1934

1,961,679

UNITED STATES PATENT OFFICE 1,961,679

POWER TRANSMISSION MECHANISM

Heinrich Wälti, Winterthur-Wulflingen, Switzerland, assignor to the firm Sulzer Frères, Société Anonyme, Winterthur, Switzerland Application April 5, 1934, Serial No. 720,145 In Switzerland February 28, 1933

11 Claims. (Cl. 64—29)

This invention relates to power-transmission mechanisms; and especially to those for the transmission of power at speeds varying through quite wide ranges. More particularly, it relates to such transmissions which are made up principally of rotary shafting. The term, "shafting", includes either a single shaft; or two or more portions; and includes those in which the dimensions and other characteristics of the several portions may be the same in all lengths or different in different lengths.

When power is applied for transmission to a rotating shaft, heavy vibration-induced stresses arise in addition to the more or less high torsional driving stresses already existing therein, especially if the shaft is rotating at a speed near one of the critical speeds of the shaft. There are critical vibrations in shafts, at different speeds, due to the periodicity of impulses, and at these points, the vibrations become intense. Where the power has to be transmitted at any number of widely divergent speeds, when a single shaft is employed there is danger of breakage or serious damage to the shaft and rest of the machinery, and this is due to the fact that no single shaft can be constructed that will have its critical speed or speeds lying outside (either above or below) the postulated range of widely-divergent operating speeds.

The chief object of the invention is to provide a rotary-shafting transmission system which will entirely obviate the usual risk of damage in such transmission arrangements due to this superimposition, on the other stresses, of these vibration and "chatter" stresses.

Other objects and advantages of the invention will become apparent from the following detailed description of several working-embodiments of the invention, taken in connection with the accompanying drawings, in which Fig. 1 is a triple-view graph showing the critical speeds, upper and lower, of three different-length transmission shafts,—short, medium, and long, respectively, when used between wide speed ranges;

Fig. 2 is a longitudinal section somewhat diagrammatic, of a transmission employing several shafts and embodying the present invention;

Fig. 3 is a double-view graph showing the critical speeds of two different length transmission shafts, a shorter and a longer, respectively, for speed-range limits narrower than those of Fig. 1;

Fig. 4 is a longitudinal section, somewhat diagrammatic, of a modification of the structure of Fig. 2;

Fig. 5 is a longitudinal section, partly in elevation, of a modification of the device shown in Fig. 4;

Fig. 6 is a somewhat diagrammatic illustration of another modification;

Fig. 7 is a similar view of still another form;

Fig. 8 is also a modified form; and

Fig. 9 is a further modification.

The three shafts graphed in Fig. 1 have lengths $l_1$, $l_2$, and $l_3$, respectively. For the purpose of illustrating the different critical speeds of these shafts, the curves shown are plotted against shaft-speeds, U, as abscissæ, and against the additional stresses due to vibration; T, as ordinates. The wide range of speeds for the three shafts is shown by $U_{max}$ and $U_{min}$. With a "short" shaft like $l_1$, the vibration stresses $R_{H1}$ and $R_{N1}$ are set up at speeds $K_{H1}$ and $K_{N1}$, respectively, these being the critical speeds of the shaft $l_1$. The critical speeds, both low and high, of this shaft are thus far out on the scale in the "high" range, and this type of shaft can be safely employed only at speeds below $K_{H1}$, as otherwise it would break under the superimposed stresses due to its periodicity. The shaft $l_2$, of the intermediate-length type, has the critical speeds, low and high, of $K_{H2}$ and $K_{N2}$, with the stresses $R_{H2}$ and $R_{N2}$ there occurring. The critical speeds of a shaft of this type, $l_2$, are thus somewhat lower than the foregoing, but nevertheless it can be safely used only at speeds below the value $K_{H2}$ or above the value $K_{N2}$. Finally, a shaft of the "long" type, $l_3$, has the two critical speeds $K_{H3}$ and $K_{N3}$, and stresses $R_{H3}$ and $R_{N3}$ thereat. Thus, though the critical speeds of shaft $l_3$ are lower than those of either $l_1$ or $l_2$, it can be safely operated, for any practical length of time, only at speeds above $K_{N3}$. Thus, as power must be, according to the initial postulate herein, transmitted at any or all the widely varying speeds between the range $U_{min}$ to $U_{max}$, no type of shaft known will accomplish the present objects, since there are at least two speeds within the above wide speed-range where prohibitive stresses would be set up, in any of the known types of shafts, so that no known type of shaft would run satisfactorily at all the speeds.

In the present invention, however, as shown in Fig. 2, for example, by providing a plurality of shaftings, the critical speeds of which differ, and by providing means whereby the drive can be transmitted through any one of the shaftings, breakage, or any other damage, is prevented. Thus, as shown by Fig. 2, the present mechanism may comprise two or more shaft portions, and means whereby the drive can be transmitted either through one shaft portion, or through two or more shaft portions in series, and the transmission through which the drive is transmitted is selectively constructed to suit the particular range of speed desired for the particular driven-machine, and this is done in such a way that the critical speed of the effective or selected part of the shafting lies outside, either above or below, the range of speed, $U_{min}$ to $U_{max}$, at which power is used.

When the power is to be transmitted at low speeds, say below the value $K_{H2}$, a long shaft, having a length corresponding to $l_3$ of Fig. 1, cannot be safely employed alone, since its critical speeds are below the value $K_{H2}$. The drive may instead be safely transmitted however, as seen by inspecting Figure 1, either through a shaft having a length $l_2$ or through a shaft having the length $l_1$, since the critical speeds of these shafts are above the value $K_{N3}$. Then the drive may be transmitted either through the shaft portion $l_1$ only, or the drive may be transmitted through the shaft portions having together the length $l_2$. Of these two alternatives, I prefer to employ that one the secondary vibrations of which have the smaller amplitude. When the power is to be transmitted at intermediate speeds, say within the range $K_{N3}$ to $K_{H1}$, a shaft of length $l_2$ could not be safely employed since its critical speeds lie within this range. The power may then be transmitted either through a shaft portion $l_1$ alone or through shaft portions together having the length $l_3$. Finally, a shaft portion like $l_1$ cannot be safely employed to transmit power at high speeds, say, above the value $K_{N2}$ and below the value $U_{max}$, but shafts either of the lengths $l_2$ and $l_3$ may then be safely employed.

In the mechanism of Fig. 2, power is transmitted from an engine 4, in a manner hereinafter described, to a pinion 5 which meshes with a gear wheel 6 from which the power is taken to the driven machine or power-consuming device. Three disconnectible coupling flanges 7, 8, and 9 are arranged respectively at distances corresponding to $l_1$, $l_2$ and $l_3$ of Fig. 1, from the front or free end of the crankshaft of the engine, the maximum effective length of transmission being indicated at 10. The flange 7 can be coupled to a flange 11 on one end of a hub formed integral with the pinion 5 so that the drive will then be transmitted from the engine 4 through the shaft portion having the length $l_1$, i. e. corresponding to the length of the shaft $l_1$ graphed in Figure 1, and thus suitable for low speeds. Alternatively, with the flange 7 uncoupled, the flange 8 may be coupled to a flange 12 on the other end of the hub of the pinion 5, whereupon the drive will be transmitted through the two shaft portions having together a length $l_2$, the effective transmission shaft then having, in effect, a length corresponding to that of the shaft $l_2$ in Figure 1, and thus suitable for intermediate speeds. Lastly, with the flanges 7 and 8 uncoupled from the flanges 11 and 12, the flange 9 may be coupled to a flange 9' on one end of a sleeve member 13 the other end of which member is coupled to the flange 12 around flange 8. The drive will then be transmitted through the whole length of the shaft 10, that is to say, through a transmission effective over the three shaft portions in series and together having a length $l_3$ corresponding to that of the shaft $l_3$ graphed in Figure 1, and thus suitable for high speeds. In the construction shown in Figure 2 the flanges 7, 8 and 9 may be suitably rigidly coupled to the corresponding flanges 11, 12, and 9' by means of such members as bolts passed through each pair of cooperative flanges.

When the limits of the speed range of the power-source are closer together, that is, when the speed-range is not so wide, the transmission mechanism may comprise no more than two shaft portions. Thus, as shown in Figure 3, the first shaft has a length $l_{21}$, and has critical speeds between the values $U_{15}$ and $U_{16}$. The second shaft, on the other hand, has a length $l_{22}$, and has critical speeds between the values $U_{14}$ and $U_{15}$, lower down on the speed range. The first shaft is suitable for use in transmitting power at low speeds, while the second shaft is suitable for use at higher speeds. A construction particularly fitted for all the speeds within this narrow speed range is illustrated in Figure 4. In this arrangement the engine or other prime-mover transmits power through a pinion 17 to a gear wheel 18 of the driven-machinery. A transmission shaft, indicated at 19, is furnished with two coupling members 23, 24 arranged at distances corresponding to $l_{21}$ and $l_{22}$ respectively from the free end of the engine crankshaft. The coupling members 23, 24 have cylindrical portions 25, 26, and are provided with movable clutch members 27, 28 longitudinally, but not rotatably movable on the cylindrical coupling members 25, 26. That is, they are loosely keyed on same. By moving the members 27, 28 in the longitudinal direction these parts can be engaged with, or disengaged from, cooperating coupling members 29, 30 formed on the hub of the pinion 17.

Thus, by moving the member 27 so that this will engage the clutch member 29, the drive will be transmitted from the engine 4 through the shaft portion having a length corresponding to $l_{21}$, through the pinion 17 and gear wheel 18. The effective portion of the transmission structure is then fitted for transmitting power at low speeds, i. e., below the value $U_{15}$ (Figure 3). If, on the other hand, the coupling 27, 29 is disengaged and the coupling 28 brought into engagement with the cooperating coupling member 30, the drive will then be transmitted through the two shaft portions in series, having then a total length corresponding to $l_{22}$. The transmission shaft is then suitable for transmitting power at high speeds, for example, above the value $U_{15}$.

A slight modification of the transmission structure of the type illustrated in Figure 4, is shown in Figure 5. In this construction, an engine crankshaft 30' journalled in a bearing 31 is provided with a radial flange 32 to which is secured a flywheel 33 having a coned axial recess 34, within which is keyed one end of a shaft length 35. The flywheel 33 is provided with teeth or claws or other detents 36 adapted to cooperate with claws 38 or other detents formed on the inner face of the ring 37. The ring 37 can be moved in the axial direction by means of a control member 50, so that the teeth 38 on the ring 37 can either be held out of engagement from the teeth 36 on the wheel and in engagement with teeth 36' (formed on an extension 40 of a hub 39 formed integral with a pinion 39); or, the ring 37 can be moved into the position shown dotted at 37a, thereby coupling the hub 40 to the flywheel 33. The outer end of the shaft 35 has a flange 41, rigidly connected by means of bolts 42, to a flange 43 formed integral with the hub of the pinion 39 which meshes with a gear wheel 44 by which gear the power is transmitted to the driven machine. The pinion 39 is supported in two bearings, 45, 46, a ring 47 centering the shaft 35 relatively to the pinion 39.

When it is desired to use the apparatus shown in Figure 5 to transmit power at low speeds, the ring 37 is moved by means of the operating member 50 until the teeth 38 on the ring 37 engage the teeth 36, whereby the flywheel 33 is positively coupled to the pinion 39. The effective transmission length then corresponds to the shaft length $l_{21}$ (Figure 4), the shaft length 35 taking no part in the power transmission. When, on the other hand, the mechanism is to transmit power at a high speed, say, for example above the speed $U_{15}$ (Figure 3), the ring 37 is moved into the position shown in full lines in Figure 5, so that the flywheel 33 is disconnected from the pinion 39. Since, however, the shaft length 35 is coupled to the pinion 39 through the flange 43, the drive will, in effect, be transmitted through the shaft lengths 30 and 35 in series, and having a length corresponding to the length $l_{22}$ shown in Figure 4.

When this transmission mechanism is to be employed for transmitting power only at low speeds, say below the speed $U_{15}$, the ring 37 is moved until the teeth 38 engage the teeth 36, (position shown in dotted lines).

The couplings shown are controlled manually, but, as shown in Fig. 6, obviously may be controlled automatically by means 40', 40'' in accordance with the speed of the transmission, or of the engine respectively, so that when, for any effective length of shafting a critical speed is reached, the governor 40' will operate so that another shafting may be automatically rendered effective, so that the critical speed of the transmission mechanism will lie outside the range of the transmission speeds.

With a view to obtaining particular vibration characteristics for individual shaftings, as shown in Fig. 7, at least one separate flywheel 41' may be provided either permanently or disconnectably coupled to a shafting or shaft portion, and, at least one of the individual shaft portions may be furnished with the well-known vibration-damping means 42' now on the market, for instance a hydraulic coupling, which may be, if desired, at the same time used as a coupling.

The coupling between the shaftings may be of other well-known types besides the flange type shown, and thus may be of the claw type, friction type, electrical type, or be a magnetic or hydraulic, clutch or coupling. The change of effective shafting length may be accomplished by any one of the well-known suitable automatic means for controlling coupling and uncoupling, as by a servomotor 43' (Fig. 5) of any type. The couplings may be disengaged by any suitable known means, such as those 44' (Fig. 8) on the market actuated in accordance with torsional vibration in the operative shafting. Also, when, for example, the wheels 6 and 5 are double-helical wheels, one or more of the couplings 91 (Fig. 9) may, if desired, be made axially yieldable, so that uniform transmission of power to both halves of the double helical wheels takes place.

The invention is particularly fitted for application to marine-prime-movers; engines; and motors, for they are expected to operate reliably and safely, and yet be smooth-running, but are nevertheless called upon to transmit power at speeds varying over very wide ranges, as during sudden stopping, starting, or reversing. Various ramifications and refinements are, however, contemplated within the scope of the sub-joined claims, and the invention may be applied to the drive of either reciprocating, radial, or rotary sources of power.

I claim:

1. A power-transmission mechanism, comprising a shafting having a certain critical speed, a coupling member thereon, another shafting having a different critical speed, means for coupling same to the first, a member surrounding said shafting and bearing a driver-member, a third shafting having still another critical speed, means for connecting same to the second shafting, a second member surrounding the third shafting, means for connecting said surrounding members, and means for connecting the second surrounding member with the third shafting.

2. A power-transmission mechanism, comprising a shaft, another shaft aligned therewith and connected thereto, a member surrounding said second shaft, said member bearing a driver, detent means for connecting said surrounding member directly to the first shaft, means for disconnecting the said detent means, and means for connecting the distal end of said second shaft to the said surrounding member.

3. A power-transmission mechanism, comprising a drive shaft, an annular member attached thereto, another shaft connected thereto, a movable ring surrounding said latter shaft, detents on the annular member, detents on the ring, means for moving the ring, means for driving a power-consuming mechanism, a hub therefor extending under said ring, detents thereon, a flange on the outer end of the second shaft, and disconnectible means connecting same to said drive means surrounding the shaft.

4. A power-transmission mechanism comprising a driving member, a driven member, shafting connected to the driving member, and means for connecting the driven member to the shafting at any of a plurality of points therealong to thereby change the critical speed of the power-transmission mechanism.

5. A power-transmission mechanism comprising a driving member, a driven member, shafting connected to the driving member, and automatic means for connecting the driven member to the shafting at any of a plurality of points therealong to thereby change the critical speed of the power-transmission mechanism, said automatic means being rendered operable by the speed of the shafting.

6. In a power-transmission, a plurality of shafting members having different critical speeds, means for coupling said members together, means for coupling a member to be driven to said shafting at any one of the aforementioned coupling means, whereby the effective length and the critical speed of the transmission may be varied.

7. In a power-transmission, a plurality of shafting members having different critical speeds, means for coupling said members together adjacent their ends to drive one member from the end of another and to vary the effective length of the shafting, and means for connecting a member to be driven to said shafting so that it may be driven by one or a plurality of said shafting members to thereby change the critical speed of the transmission.

8. In a power-transmission, a plurality of shafting members, clutch couplings for connecting said members together adjacent their ends, means for selectively transmitting drive through any number of the shaftings in series whereby the effective length of the shafting and its critical speed is varied and is dependent upon the number of shafting members connected to transmit power at a given transmission speed.

9. A power-transmission mechanism comprising a driving shaft, a member surrounding said shaft having a driver-member thereon, and means for coupling the surrounding member to the driving shaft at different points along the length of the driving shaft whereby the effective length of the driving shaft and its critical speed may be varied.

10. A power-transmission mechanism comprising shafting having coupling members located at points along its length corresponding to different values of critical speed limits of the shafting, a member surrounding said shafting having a driver-member thereon, another member surrounding said shafting and connected to the first member, and means for selectively connecting the surrounding members to said couplings whereby the effective length and the critical speed of the transmission may be varied.

11. A power-transmission mechanism, comprising a plurality of shafting members having different critical speeds, said shafting members being coupleable, means for transmitting the drive through one or a plurality of said members, and means for automatically varying the effective length of the shafting by coupling a second shafting member when a critical speed of the first shafting member has been reached.

HEINRICH WÄLTI.